(12) United States Patent
Roberts et al.

(10) Patent No.: US 8,387,102 B1
(45) Date of Patent: Feb. 26, 2013

(54) METHOD AND SYSTEM FOR MINIMIZING A NUMBER OF DATA STREAMS

(75) Inventors: Thomas A. Roberts, Fuquay-Varina, NC (US); James Evans, Apex, NC (US); Gregory M. Evans, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 378 days.

(21) Appl. No.: 12/341,784

(22) Filed: Dec. 22, 2008

(51) Int. Cl.
*H04N 7/173* (2011.01)
(52) U.S. Cl. ............................................ 725/97; 725/94
(58) Field of Classification Search ................ 725/94, 725/97
See application file for complete search history.

(56) References Cited

U.S. PATENT DOCUMENTS

| | | | | |
|---|---|---|---|---|
| 5,027,400 A | * | 6/1991 | Baji et al. .................... | 725/116 |
| 5,592,551 A | * | 1/1997 | Lett et al. .................... | 380/211 |
| 7,535,903 B1 | * | 5/2009 | Patel ........................... | 370/390 |
| 7,788,393 B2 | * | 8/2010 | Pickens et al. ............... | 709/231 |
| 2007/0162392 A1 | | 7/2007 | McEnroe et al. | |
| 2007/0177632 A1 | * | 8/2007 | Oz et al. ....................... | 370/486 |

OTHER PUBLICATIONS

Derek Eager et al., "Minimizing Bandwidth Requirements for On-Demand Data Delivery," (article), Sep./Oct. 2001, pp. 742-757, vol. 13, issue 5, IEEE Transactions on Knowledge and Data Engineering, http://www.cs.washington.edu/homes/zahorjan/papers/streaming/mis99.pdf.

* cited by examiner

*Primary Examiner* — Brian Pendleton
*Assistant Examiner* — Olugbenga Idowu
(74) *Attorney, Agent, or Firm* — Withrow & Terranova, PLLC

(57) ABSTRACT

A method and system for minimizing data streams of the same program on a shared medium. A user device receives a first data stream of a program and effects display of the program based on the first data stream to a display device. The user device halts display of the program and provides an advertisement to a viewer. A second data stream of the program being provided over the same medium to a second viewer that was initiated after the first data stream is provided to the user device. The user device buffers the second data stream, and after the advertisement is finished, provides the program to the viewer based on the second data stream.

12 Claims, 4 Drawing Sheets

METHOD AND SYSTEM FOR MINIMIZING A NUMBER OF DATA STREAMS

FIELD OF THE INVENTION

This invention relates to reducing data streams, and in particular to minimizing the number of data streams necessary to service a number of viewers of the same program.

BACKGROUND OF THE INVENTION

Video on demand (VOD) is a service that enables a consumer to request a program at a time that is most convenient to the consumer. VOD has proven to be popular with consumers for the flexibility and choices offered, and with service providers for the revenue generated. A viewer typically orders a VOD program by selecting a VOD program from an electronic programming guide displayed on a display device, such as a television or computer monitor. A user device, such as a set top box or a computer, processes the viewer's selection and initiates a request for the VOD program to the entity that provides the VOD service. This request may be serviced by equipment in a service provider's network such as a headend that manages the distribution of programs, both VOD and broadcast, to a number of viewers. The headend is typically connected to many residences via a shared medium, such as a fiber or coaxial cable. In order for the headend to be able to provide the requested VOD program to the viewer, the medium must have sufficient available bandwidth to carry the VOD program. If the medium is at capacity and no available bandwidth exists, the headend must deny the request or delay providing the VOD program until sufficient bandwidth becomes available. In either event, the viewer is not as satisfied as if the VOD program had been provided instantaneously.

High Definition (HD) programming is becoming increasingly popular as consumers migrate from analog televisions to digital televisions. Unfortunately for service providers, a program encoded in HD typically uses more bandwidth than a program encoded in a lower resolution. Thus, HD programming increases utilization of the shared medium that connects the headend to multiple residences, decreasing the likelihood that sufficient bandwidth will be available to service VOD requests.

It is not uncommon for different viewers serviced by the same headend to request the same program at different times throughout the day. Currently, however, even when two viewers request the same VOD program within minutes of one another, a separate data stream of the VOD program is sent over the shared medium for each viewer. For example, during popular VOD usage times, such as on a weekend evening, there may be multiple requests for the same VOD program from separate viewers, each request requiring a separate data stream, and each request reducing the available bandwidth of the medium. Eventually the medium will become fully loaded and viewers' requests for VOD programs will go unfulfilled, increasing dissatisfaction among viewers and reducing revenue the service provider might have earned had more bandwidth been available. It would be beneficial to viewers and service providers alike if multiple viewers that initiate a request of the same VOD program at different times could share the same data stream of the VOD program.

SUMMARY OF THE INVENTION

The present invention allows multiple viewers of the same program to share a data stream of the same program, even though each viewer of the program requested the program at a different time from the other viewers. A first viewer requests a program. A user device of the first viewer receives a first data stream of the requested program and provides the first data stream for display to the viewer. The user device includes a storage device, such as a hard drive. The user device monitors the first data stream for a break marker. Upon detection of the break marker, the user device provides an advertisement for display to the viewer for a predetermined duration of time. According to one embodiment of the invention, the advertisement is stored on the storage device prior to being provided for display to the viewer. The first data stream does not contain advertisements and continues to be received by the user device and buffered to the storage device while the advertisement is provided for display to the viewer.

The user device initiates a request for a second data stream of the requested program that is currently at a program location between an earliest specified program location and a latest specified program location of the first data stream. The earliest specified program location is the break marker location of the first data stream minus the predetermined duration of time and minus the duration of any buffered portions of the requested program. The latest specified program location is the break marker location of the first data stream.

If a second data stream having a program location between the earliest specified program location and the latest specified program location exists, the user device begins to receive and monitor the second data stream. When the user device detects the corresponding break marker, the user device begins to buffer the second data stream to the storage device. The user device can indicate that the first data stream is no longer needed. When the advertisement finishes, the user device can provide the second data stream of the requested program for display to the viewer at the same program location where the first data stream was halted to provide the advertisement for display to the viewer. The process of monitoring a data stream for a break marker, requesting a new data stream between two program locations, and receiving and buffering a new data stream preferably repeats during the entire duration of the requested program. In this manner, data streams of the same program can be minimized.

According to one embodiment of the invention, the predetermined duration of time is a fixed amount of time corresponding to a length of the advertisement and the viewer is inhibited from fast forwarding through the advertisement. According to another embodiment of the invention, the predetermined duration of time is not fixed, and the advertisement can be fast forwarded by the viewer. In such an embodiment, the earliest specified program location is the break marker location of the data stream minus the duration of any buffered portions of the requested program.

The advertisement may be a locally stored advertisement that was received by the user device prior to receiving the first data stream, or may be obtained from a common multicast channel providing advertisements on an ongoing basis. The user device may begin to receive and buffer an advertisement from the common multicast channel for display to the viewer prior to detecting the break marker, so that the user device is capable of providing an advertisement for display to the viewer upon detection of the break marker.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

For purposes of illustration the present invention will be discussed herein in the context of a cable service provider providing video on demand (VOD) services to a number of consumers over a shared medium serviced by a headend. However, the present invention is not limited to cable service providers, and is applicable to any situation in which multiple streams of the same program are offered over a shared medium and the devices providing the program to the consumers are capable of buffering at least some of the program.

Figure 1:
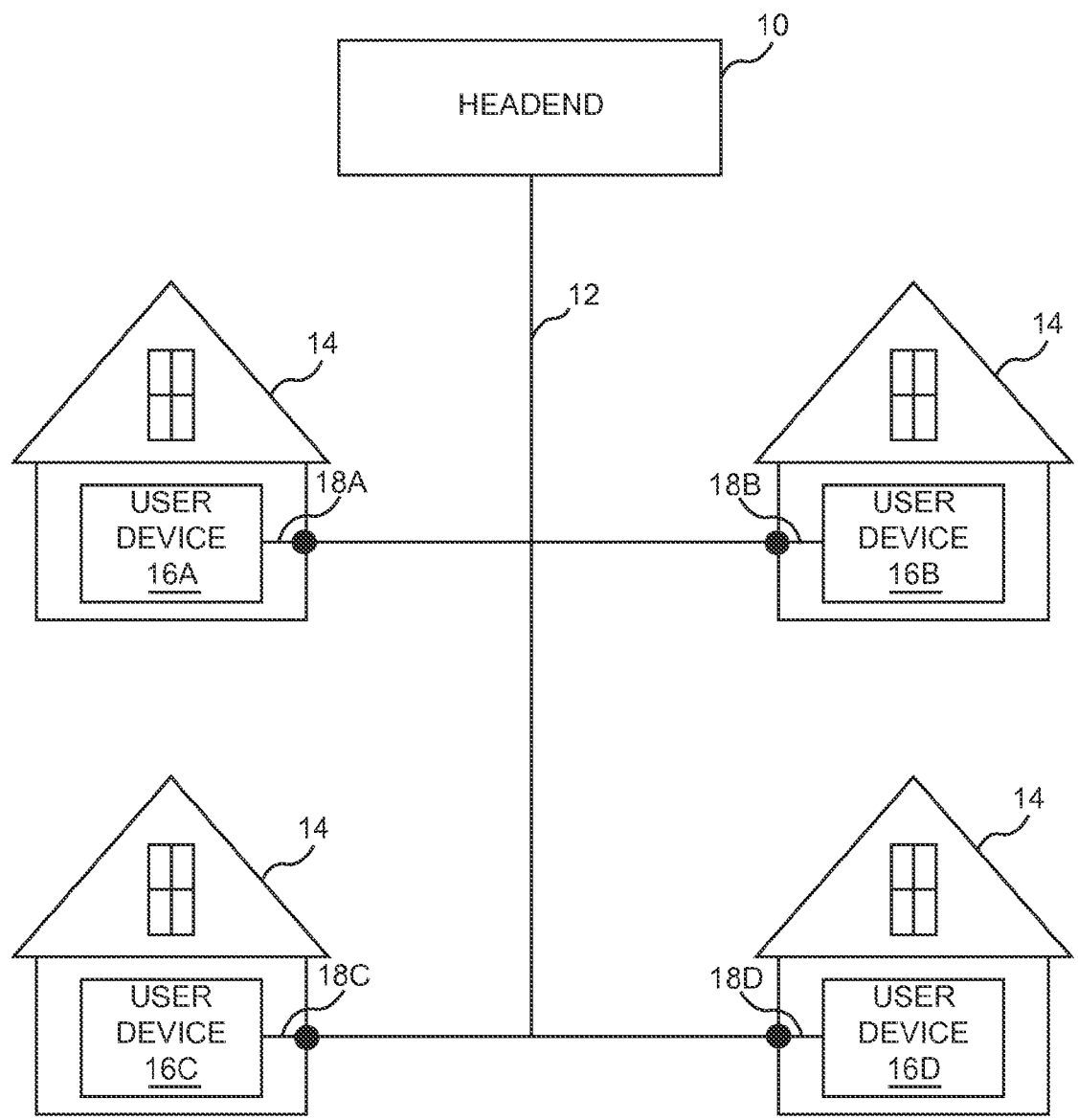
FIG. 1 is a diagram of a cable infrastructure suitable for implementing aspects of the present invention.

FIG. 1 is a diagram of a cable infrastructure suitable for implementing aspects of the present invention in the context of a cable service provider providing broadcast and VOD services to a plurality of residences. A headend 10 provides programming services over a shared medium 12, such as a fiber or coaxial cable, to a plurality of end points, such as businesses or residences 14. User devices 16A, 16B, 16C, and 16D are also coupled to the shared medium 12 via local links 18A, 18B, 18C, and 18D, respectively. For purposes of illustration and clarity, the user devices 16A, 16B, 16C, and 16D may be referred to singularly as the user device 16 or collectively as the user devices 16 when the discussion relates to user devices generally rather than a specific user device 16A, 16B, 16C, or 16D. Likewise, the local links 18A, 18B, 18C, and 18D may be referred to singularly as the local link 18 or collectively as the local links 18 when the discussion relates to local links generally rather than a specific local link 18A, 18B, 18C, and 18D.

The headend 10 can comprise any suitable equipment capable of receiving and responding to requests from the user devices 16 for programming. The overall cable infrastructure of a particular cable service provider typically includes a number of headends, wherein each headend provides programming services to a relatively large number of residences 14. While for purposes of illustration the shared medium 12 is shown as having a relatively simple configuration with connections to a number of residences 14, in reality it is common for the shared medium 12 to comprise a relatively complex tree and branch hierarchy with multiple splitters and amplifiers to ensure sufficient signal strength to each residence 14, as will be apparent to those skilled in the art.

The user devices 16 can comprise any suitable equipment capable of interacting over a respective local link 18 and the shared medium 12 with the headend 10. The local links 18 can comprise any suitable wired or wireless technology capable of coupling the shared medium 12 with the respective user device 16. For example, the user device 16A may comprise a set top box, and the local link 18A may comprise a coaxial cable. The user device 16B may comprise a personal computer, and the local link 18B may comprise an Ethernet cable coupled to a cable modem that is in turn coupled to the shared medium 12. The user device 16C may comprise a wireless handheld device, and the local link 18C may comprise a wireless technology, such as 802.11. The user device 16D may comprise a cellular telephone and the local link 18D may comprise a cellular connection with a cell tower (not shown) that is coupled to the shared medium 12. Each of the user devices 16 typically has an associated display device. For example, the user device 16A may have a television monitor, the user device 16B may have a liquid crystal display (LCD) computer monitor, and the user devices 16C and 16D may have integrated LCD screens.

In a conventional service provider environment, if the user device 16A requests a VOD program, such as the movie "Bambi" for example, at a particular time, such as 3:00 PM for example, the headend 10 can service that request, ensure sufficient bandwidth exists on the shared medium 12 for transmission of the movie, and begin transmission of a first data stream of "Bambi" to the user device 16A over the shared medium 12. If the user device 16B requests "Bambi" at 3:03 PM, the process repeats and, assuming sufficient bandwidth exists on the shared medium 12, a second data stream of the movie "Bambi" will be sent to the user device 16B over the shared medium 12. It should be apparent that if a sufficient number of user devices 16 request the movie "Bambi" within a given time period, the bandwidth of the shared medium 12 will ultimately be exceeded. It should also be noted that the shared medium 12 typically not only provides VOD programming, but also provides broadcast programming and high-speed broadband access to computers in the residences 14. As such, the shared medium 12 may have little available bandwidth at peak usage times.

According to one embodiment of the invention, and as described in detail herein, the first and second data streams of the movie "Bambi" each include break markers indicating a time when the respective user device 16 should halt providing the respective data stream for display to the respective viewer, and begin providing an advertisement for display to the viewer. For example, assume that a break marker exists at every 10 minute interval of "Bambi." The user device 16A, which requested "Bambi" at 3:00, detects a break marker in the first data stream at 3:10 and stops providing "Bambi" for display to the viewer and begins providing an advertisement for display to the viewer. The first data stream does not include advertisements and continues to be streamed to the user device 16A, which buffers the first data stream on a local storage device while the advertisement is provided for display to the viewer. The advertisement may be stored locally on the user device 16A prior to requesting "Bambi."

The user device 16A then calculates an earliest data stream location time (EDLT) by subtracting a predetermined advertisement duration time from the location in the first data stream of the break marker. Assuming a predetermined advertisement duration time of 4 minutes, the earliest data stream location time is EDLT=10−4=6. A latest data stream location time (LDLT) is determined to be 10, which represents the location of the break marker in the first data stream where the program was halted for display to the viewer in order to provide the advertisement for display to the viewer. The user device 16A sends a request to the headend 10 requesting whether any data streams of the movie "Bambi" are currently being provided over the shared medium 12 that are currently at a location between the EDLT and the LDLT. The headend 10 determines that the second data stream of "Bambi" being provided to the user device 16B has a current location time of 7, which is in between the EDLT (6) and the LDLT (10). The headend 10 provides the second data stream of "Bambi" to the user device 16A. The user device 16A begins to monitor the second data stream for a break marker. The user device 16A can inform the headend 10 that the first data stream is no longer required by the user device 16A. If the user device 16A was the only user device 16 receiving the first data stream, the headend 10 can halt the first data stream, freeing up bandwidth on the shared medium 12 for other services, such as providing another VOD program to another user device 16. The headend 10 can add the user device 16A to the second data stream. According to one embodiment of the invention, the first and second data streams are multicast data streams.

The user device 16A detects the break marker in the second data stream and begins to buffer the second data stream to a local storage device. Since the second data stream was initiated 3 minutes after the first data stream, and since the predetermined advertisement duration time is 4 minutes, the user device 16A is able to buffer one minute of the second data stream, i.e., the eleventh minute of "Bambi," before the advertisement is finished being provided to the viewer. After the advertisement is finished, the user device 16A begins to provide the eleventh minute of "Bambi" from the buffer for display to the viewer. The user device 16A continues to buffer the second data stream to the local storage device. In this manner, the first data stream is eliminated, freeing up bandwidth on the shared medium 12 in a manner that is transparent to the viewer associated with the user device 16A.

Figure 2:
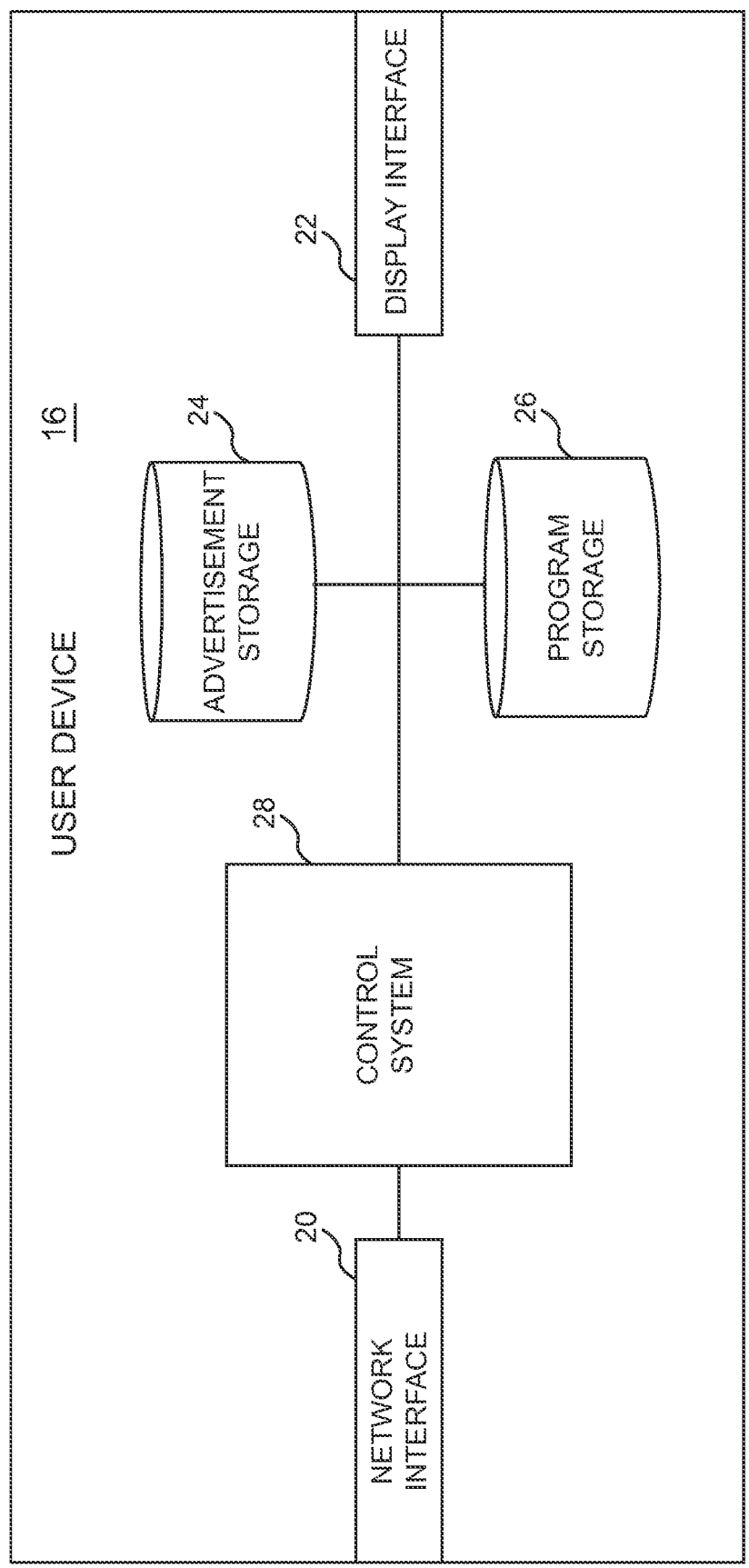
FIG. 2 is a block diagram of a user device according to one embodiment of the present invention.

FIG. 2 is a block diagram of one of the user devices 16 illustrated in FIG. 1 according to one embodiment of the present invention. The user device 16 includes a network interface 20 for communicating with the shared medium 12 either directly or via another communications link, such as the local link 18. A display interface 22 interfaces with a display device suitable for the respective user device 16. An advertisement storage 24 can be used to store local advertisements that can be provided for display to a display device via the display interface 22 when a break marker is detected by the user device 16. A program storage 26 is used to buffer data streams of a program prior to providing the program for display to the viewer. The advertisement storage 24 and the program storage 26 are illustrated as separate storage devices for purposes of illustration, but may comprise the same or separate physical devices. The storage devices 24 and 26 can comprise any suitable electronic storage such as a hard disk drive or random access memory. The storage devices 24 and 26 may be integral with the user device 16, or may be independent of the user device 16 but coupled to the user device 16 over a relatively high speed communications channel, such as an Ethernet cable or a Universal Serial Bus (USB) cable. A control system 28 contains a memory, software, and circuitry (not shown) configured to implement the functionality described herein. The control system 28 can include a general purpose processor that executes one or more programs developed in a conventional or proprietary programming language, and can comprise specialized circuitry adapted to provide all or a portion of the functionality described herein. As discussed previously, the user device 16 can be implemented in any suitable equipment capable of providing programming to a viewer, such as a set top box, a computer, a cell phone, and the like.

Figure 3:
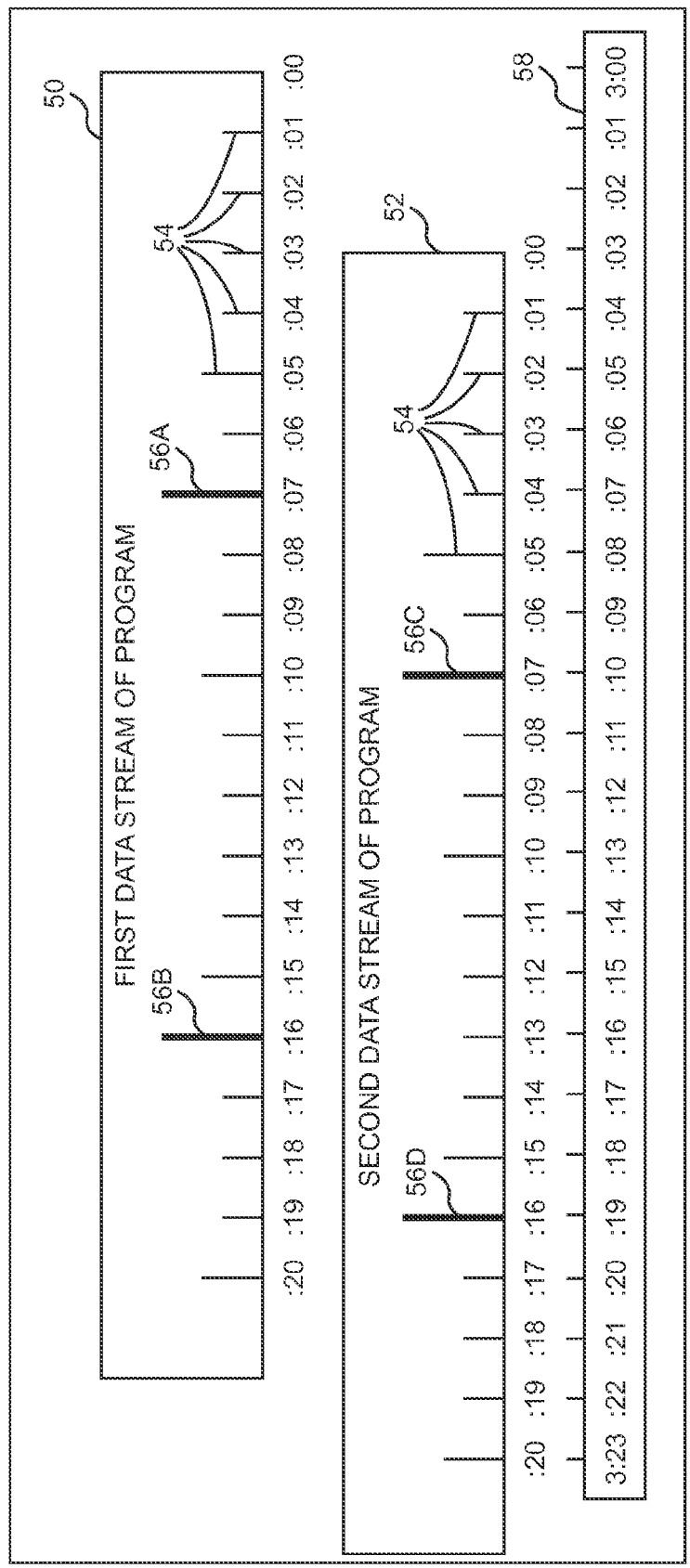
FIG. 3 is a diagram illustrating portions of first and second data streams of a program.

FIG. 3 is a diagram illustrating portions of first and second data streams of a program. A first data stream 50 and a second data stream 52 of a program, such as the movie "Bambi," were requested by different viewers at different times. Location increments reflecting one-minute intervals within the respective first and second data streams 50 and 52 are shown with ticks 54. For clarity, not all ticks 54 are labeled with the element reference character 54, but it should be apparent that each tick 54, whether labeled with the element reference character 54 or not, represents a one-minute interval from an adjacent tick 54. References to locations within each data stream 50 and 52 will be made with reference to the minute interval associated with such location as reflected by the minute depicted under each tick 54 in FIG. 3. The first data stream 50 also has break markers 56A and 56B at locations :07 and :16, respectively. The second data stream 52 likewise has break markers 56C and 56D at locations :07 and :16, respectively. For purposes of illustration, break markers such as break markers 56A-56D may be referred to singularly as a break marker 56 or collectively as break markers 56 when not discussing a particular break marker 56A-56D. Each break marker 56 is a signal in the respective data stream 50 and 52 and may be received by a respective user device 16 without halting the continuing reception of the respective data stream 50 and 52. Where the data streams 50 and 52 comprise digitized data, the break markers 56 may comprise a packet having a special pattern that indicates a break.

A time bar 58 reflects an absolute time that will be used to describe the first and second data streams 50 and 52. It may be assumed that the times shown in the time bar 58 begin at 3:00, although the hour is not shown in each time in the time bar 58. For example, at 3:08, the first data stream 50 is at location :08 and the second data stream 52 is at location :05. Assume that a first viewer requests the movie "Bambi" at 3:00, and an associated first user device 16 begins receiving the first data stream 50 at 3:00. A second viewer requests "Bambi" at 3:03, and an associated second user device 16 begins receiving "Bambi" at 3:03. At 3:07, the first user device 16 detects the break marker 56A in the first data stream 50. The user display halts providing "Bambi" for display to the viewer and begins to provide an advertisement from the advertisement storage 24 (FIG. 2) for display to the viewer. Note that at 3:07, the second user device 16 is at location :04 of the second data stream 52. The first user device 16 continues to buffer the first data stream 50 to the program storage 26 (FIG. 2) since the first data stream 50 does not contain any advertisements and continues to be provided to the first user device 16 while the advertisement is presented for display to the first viewer.

Assume that an advertisement duration time during which one or more advertisements will be provided for display to the viewer is 4 minutes. The first user device 16 determines that EDLT=break marker location time (BMLT) (7)−advertisement duration time (4)=7−4=3, and that LDLT=BMLT=7. The first user device 16 requests a second data stream at a location between EDLT (3) and LDLT (7) from the headend 10 (FIG. 1). The headend 10 determines that the second data stream 52 is at location :04, which is between EDLT (3) and LDLT (7), and provides the second data stream 52 to the first user device 16. Note that the first user device 16 begins to receive the second data stream 52 at location :04 of the second data stream 52. Because the viewer was at location :07 of the first data stream 50 when the first data stream 50 was halted, the first user device 16 does not need to buffer the second data stream 52 initially. The first user device 16 monitors the second data stream 52 until 3:10 at which time the break marker 56C is detected. The first user device 16 begins to buffer the second data stream 52 to the program storage 26 at location :07 of the second data stream 52, which is the precise location of the first data stream 50 where the advertisement was presented for display to the viewer. Also note that the advertisement will be finished at 3:11, at which time the first user device 16 will have buffered one minute of the second data stream 52. At 3:11, the first user device 16 begins to provide "Bambi" to the viewer based on the second data stream 52 at the precise location "Bambi" was halted in the first data stream 50 to display the advertisement to the viewer. The first user device 16 continues to buffer the second data stream 52 and provide "Bambi" to the viewer based on the second data stream 52. At 3:19, when the first user device 16 detects the break marker 56D, the first user device 16 will again calculate a EDLT and a LDLT and determine whether an additional data stream exists that is at a location between EDLT and LDLT. If the first user device 16 was the only user device 16 receiving the first data stream 50, the first data stream 50 can be terminated.

Figure 4:
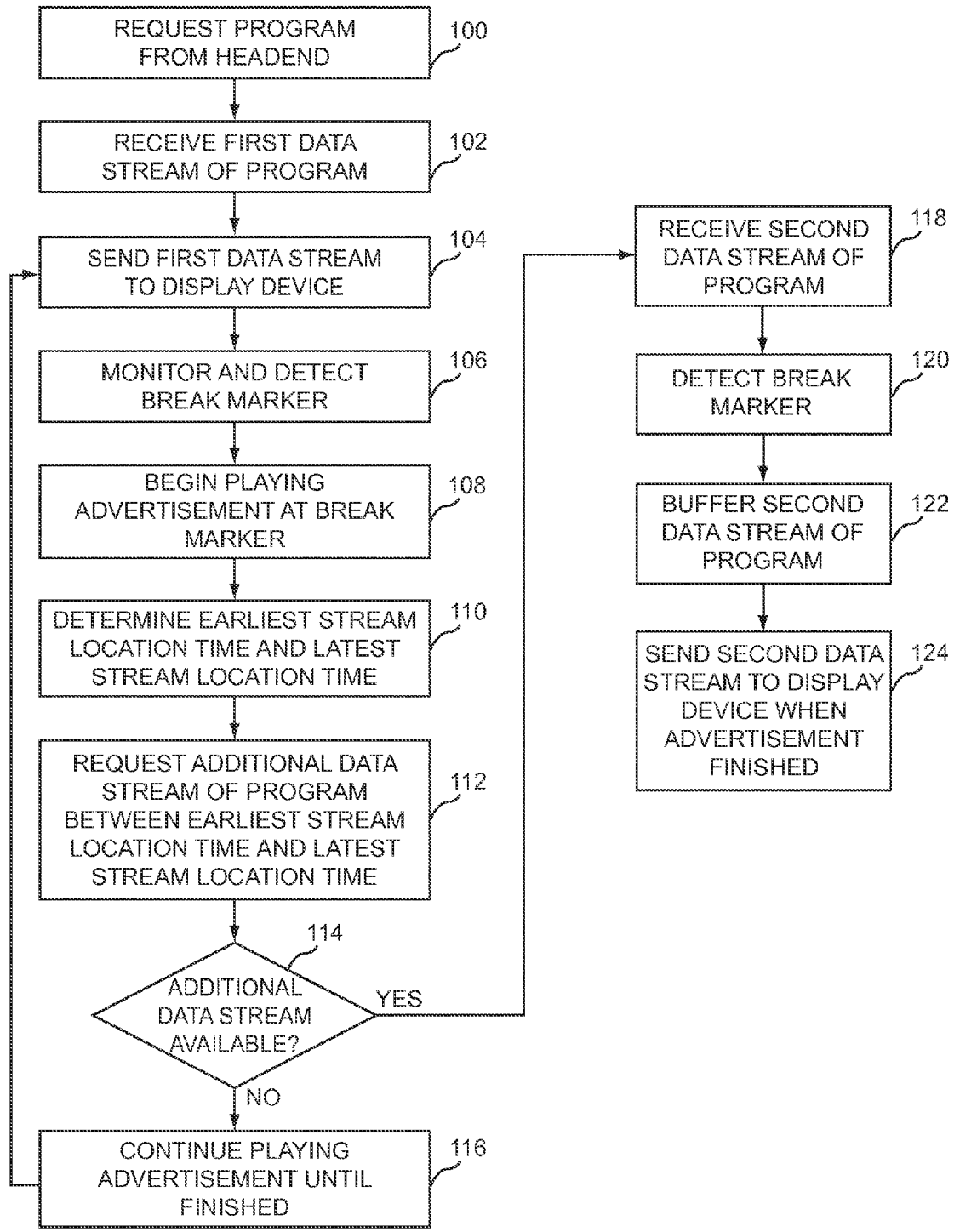
FIG. 4 is a flow chart illustrating a method for minimizing a number of data streams according to one embodiment of the invention.

FIG. 4 is a flow chart illustrating a method for minimizing a number of data streams according to one embodiment of the invention. It is assumed that a viewer, or consumer, selects a particular program via, for example, an electronic programming guide shown on a display device. The viewer may indicate their desire to watch a particular program via an input device coupled to a user device 16, such as a remote control, a mouse, a keyboard, or the like. The user device 16 then formats and initiates a request for the selected program over the shared medium 12 to the headend 10 (step 100). The headend 10 obtains the selected program and, assuming sufficient bandwidth exists on the shared medium 12, begins streaming a first data stream of the program to the user device 16. As a result, the user device 16 begins to receive the first data stream (step 102).

According to one embodiment of the invention, the user device 16 may buffer the first data stream for a minimum buffer time prior to providing the first data stream for display to the viewer. Such buffering may be desirable to ensure that a portion of the first data stream is available for display to the viewer at a particular data rate even though the first data stream may not be consistently provided over the shared medium 12 at the same data rate. In other words, an initial buffer may be useful in moderating a non-uniform data transmission rate over the shared medium 12. It will be assumed for purposes of discussing FIG. 4 that a minimum buffer time is one minute. Thus, for one minute the user device 16 buffers the first data stream to the program storage 26. During this minimum buffer time the user device 16 can provide another program, such as an advertisement, for display to the viewer. After buffering the first data stream for the minimum buffer time, the display device provides the program for display to the viewer based on the first data stream. The user device 16 continues to buffer the first data stream while simultaneously providing the program for display to the viewer based on the first data stream (step 104).

The user device 16 monitors the first data stream and eventually detects a break marker (step 106). Because the first data stream is buffered for the minimum buffer time, the user device 16 continues to provide the program for display to the viewer from the buffered portion of the first data stream until the location of the program is at the break marker. When the buffered first data stream being provided for display to the viewer reaches the break marker, the user device 16 stops providing the first data stream for display to the viewer and begins providing an advertisement for display to the viewer (step 108). The advertisement can be stored locally in the advertisement storage 24. The advertisements may be provided to the user device 16 by the service provider on a periodic basis, and may be targeted for the particular subscriber associated with the user device 16. Alternately, the service provider associated with the user device 16 may provide one or more common multicast advertisement channels that carry advertisements 24 hours a day, and that can be received by any user device 16. The user device 16 may monitor the common multicast advertisement channel and begin buffering an advertisement prior to detecting the break marker in anticipation of providing an advertisement for display to the viewer upon detection of the break marker.

Although the user device 16 continues to provide the program for display to the viewer for the minimum buffer time minutes after the break mark has been detected, upon detection of the break marker the user device 16 calculates an EDLT and LDLT (step 110). Assume an advertisement duration time of 4 minutes and that the break marker was detected at a 10 minute location in the first data stream. The user device 16 determines an EDLT by subtracting the advertisement duration time (4) from the break marker location time (10), thus EDLT=10−4=6. Note that for purposes of maintaining a minimum buffer time of the program in the program storage 26, the minimum buffer time was not taken into account in the determination of the EDLT. However, if additional minutes of the program have been buffered in excess of the minimum buffer time, such additional minutes can also be subtracted from the BMLT when calculating the EDLT. Additional minutes of the program may be buffered, for example, after several iterations of the process described herein for a respective user device 16, as described with regard to step 122 below.

The user device 16 initiates a request from the headend 10 for an additional data stream of the program that is at a current location between the EDLT and the LDLT (step 112). Note that the user device 16 has continued to buffer the first data stream to the program storage 26. If the headend 10 indicates that no additional data streams of the program at a location between the EDLT and the LDLT exist (step 114), then the user device 16 eventually finishes providing the advertisement for display to the viewer (step 116), and the process returns to step 104. If, however, the headend determines that an additional data stream of the program at a location between the EDLT and the LDLT exists (step 114), referred to herein as a second data stream, the headend 10 can provide the second data stream of the program to the user device 16. The particular process for adding the user device 16 to the second data stream may differ depending upon the particular technology utilized to provide data streams by the respective service provider.

The user device 16 begins to receive the second data stream (step 118). The user device 16 monitors the second data stream until it detects a break marker (step 120). The user device 16 begins to buffer the second data stream to the program storage 26 (step 122). If the second data stream is at a location past the EDLT plus the minimum buffer time when provided to the user device 16, the user device 16 will begin to buffer the second data stream at a location such that more than the minimum buffer time will be stored in the program storage 26 when the advertisement is finished being provided for display to the viewer. After the advertisement is finished, the user device 16 begins to provide the program to the viewer based on the buffered second data stream at the same program location where the viewer stopped viewing the program based on the first data stream (step 124). The user device 16 can indicate to the headend 10 that the first data stream is no longer needed. Alternately, the headend 10 may determine that the first data stream is no longer needed when the user device 16 is provided the second data stream. If there are no additional viewers of the program based on the first data stream, the first data stream can be terminated by the headend 10, freeing up bandwidth of the shared medium 12.

Note that the steps of the current process are provided in a certain order for purposes of illustration but may take place relatively simultaneously, or may take place in a different order without departing from the scope of the invention herein. For example, steps 110-114 may occur previous to, simultaneous with, or after step 108 depending on whether a minimum buffer time is used and depending in part on the manner in which the process is implemented by a respective service provider.

According to one embodiment of the invention, the advertisement duration time is fixed and cannot be altered by a viewer who, for example, desires to fast forward through the advertisement. Inhibiting a viewer from fast forwarding through advertisements is becoming increasingly common. In such an embodiment, the predetermined advertisement duration time can be subtracted from the BMLT when determining the EDLT. According to another embodiment of the invention, the advertisement duration time is not fixed, and the viewer is not inhibited from fast forwarding through the advertisement. In such an embodiment, the user device 16 can choose to defer requesting an additional data stream until such time as a buffer of the program exists in the program storage 26 in excess of a minimum buffer time, if any. For example, upon detection of the first break marker in the first data stream, the user device 16 may not request an additional data stream and may merely continue to buffer the first data stream to the program storage 26 while providing the advertisement for display to the viewer. Assume that the viewer watches the initial two advertisements for a two minute period of time, and then becomes impatient for the program and fast forwards to the end of the advertisements. Because the viewer watched the first two minutes of the advertisements, the user device 16 has now buffered an additional 2 minutes of the first data stream in excess of the minimum buffer time, if any. When the next break marker is detected, the user device 16 can use the 2 minute buffer to calculate a EDLT, and request an additional data stream from the headend 10 having a location between the EDLT and the LDLT (LDLT=BMLT).

program, and the viewer A begins to view the first minute of the program. At 3:02 the user device 16A continues to receive the first data stream, begins to buffer the third minute of the program, and the viewer A begins to watch the second minute of the program, which is being provided for display to the viewer A by the user device 16A from the program storage 26.

At 3:04, the user device 16A continues to receive the first data stream, and the user device 16B of the viewer B begins to receive the second data stream of the program. The user device 16A buffers the fifth minute of the program and the user device 16B buffers the first minute of the program. The viewer A begins to watch the fourth minute of the program, and the viewer B preferably views an advertisement (not shown) as the user device 16B begins buffering the second data stream for 1 minute. At 3:05 the user device 16A continues to receive the first data stream and the user device 16B continues to receive the second data stream. The user device 16A begins to buffer the sixth minute of the program and the user device 16B begins to buffer the second minute of the program. The viewer A begins to watch the fifth minute of the

TABLE 1

| Time | Stream +190 | | Stream Minute | | Buffered Minutes | | Viewing Minute | |
|------|---------------|---------------|---------------|---------------|---------------|---------------|---------|---------|
|      | USER DEVICE 16A | USER DEVICE 16B | USER DEVICE 16A | USER DEVICE 16B | USER DEVICE 16A | USER DEVICE 16B | VIEWER A | VIEWER B |
| 3:00 | 1 |   | 1 |   | 1 |   | 0 |   |
| 3:01 | 1 |   | 2 |   | 1 |   | 1 |   |
| 3:02 | 1 |   | 3 |   | 1 |   | 2 |   |
| 3:03 | 1 |   | 4 |   | 1 |   | 3 |   |
| 3:04 | 1 | 2 | 5 | 1 | 1 | 1 | 4 | 0 |
| 3:05 | 1 | 2 | 6 | 2 | 1 | 1 | 5 | 1 |
| 3:06 | 1 | 2 | 7 | 3 | 1 | 1 | 6 | 2 |
| 3:07 | 1 | 2 | 8 | 4 | 1 | 1 | 7 | 3 |
| 3:08 | 1 | 2 | 9 | 5 | 1 | 1 | 8 | 4 |
| 3:09 | 1 | 2 | 10 | 6 | 1 | 1 | 9 | 5 |
| 3:10 | 2 | 2 | 7 | 7 | 1 | 1 | 10 | 6 |
| 3:11 | 2 | 2 | 8 | 8 | 0 | 1 | ad | 7 |
| 3:12 | 2 | 2 | 9 | 9 | 0 | 1 | ad | 8 |
| 3:13 | 2 | 2 | 10 | 10 | 0 | 1 | ad | 9 |
| 3:14 | 2 | 2 | 11 | 11 | 1 | 1 | ad | 10 |
| 3:15 | 2 | 2 | 12 | 12 | 1 | 2 | 11 | ad |

Table 1 illustrates aspects of the present invention for a portion of a program where a first viewer A requests a program at 3:00 and a second viewer B requests the same program at 3:04. The example in Table 1 assumes a predetermined advertisement duration time of four minutes that cannot be inhibited by a viewer, a minimum buffer time of one minute, and a break marker at the end of the tenth minute of the program. A user device 16A is associated with the viewer A and a user device 16B is associated with the viewer B. The column of the table entitled "Steam #" indicates which data stream of the program is being received by which respective user device 16. The column entitled "Stream Minute" indicates which minute of the program is received by the respective user device 16. The column entitled "Buffered Minutes" indicates the number of minutes of the program in the program storage 26 of the respective user device 16 at a particular time. The column entitled "Viewing Minute" indicates which minute of the program the respective viewer is viewing at a particular time. Each row of the table reflects a particular time of day, as indicated by the column entitled "Time." It is assumed there is a minimum buffer time of one minute. At 3:00 the user device 16A begins to receive the first data stream and begins to buffer the first minute of the program in the program storage 26. The viewer A has not yet begun to view the program. At 3:01 the user device 16A continues to receive the first data stream, begins to buffer the second minute of the program and the viewer B begins to watch the first minute of the program. A similar sequence, as illustrated in Table 1, occurs from 3:06-3:08. At 3:09, the user device 16A begins to buffer the tenth minute of the first data stream and the user device 16B begins to buffer the sixth minute of the second data stream. The viewer A begins to watch the ninth minute of the program and the viewer B begins to watch the fifth minute of the program.

At 3:10 the user device 16A detects a break marker. The user device 16A calculates an EDLT=BMLT (10)−(extra buffered minutes (0)+predetermined advertisement duration time (4))=6. The user device 16A requests an additional data stream of the program having a current location at least at the sixth minute of the program, but not later than the tenth minute of the program. The headend 10 determines that the second data stream is at the seventh minute of the program and provides the second data stream to the user device 16A in response to the request, as indicated in the "Stream #" column of Table 1 for the user device 16A. Note that if a plurality of second data streams were available, selecting the second data stream which is at the earliest point in the EDLT-LDLT range will reduce the total number of data streams sooner, over a period of time. Note that at 3:10 while user device 16A is calculating an EDLT and obtaining the second data stream, the viewer A is watching the beginning of the tenth minute of the program that is being provided from the buffer of the user device 16A. During minutes 3:11-3:13, the user device 16A monitors the second data stream for a break marker, but does not buffer the second data stream because the viewer A has already viewed those minutes of the program. The user device 16B receives minutes 8-10 of the program. The viewer A watches the first three minutes of advertisements, and the viewer B watches minutes 7-9 of the program.

At 3:14 the user device 16A begins to buffer the eleventh minute of the second data stream while the viewer A watches the final minute of advertisements. The user device 16B is at the end of the tenth minute of the program, detects a break marker, and calculates an EDLT as described previously with respect to the user device 16A. However, the headend 10 has no additional data streams of the program that can be provided to the user device 16B. At 3:15 the user device 16A begins to provide the eleventh minute of the program for display to the viewer A, at the exact location of the program where the viewer A was stopped prior to providing the advertisement for display to the viewer A. Note that the viewer B begins to watch the first of four minutes of advertisements. Also note that the user device 16B continues to buffer the second data stream and begins to increase the number of buffered minutes because no additional data streams of the program are available. Note that an increase in buffered minutes results in a decrease in a calculated EDLT, which increases the likelihood of locating a second data stream.

Tables 2A and 2B illustrate how the present invention can minimize data streams of the same program for a hypothetical situation where five different viewers request the same hour-long program over the course of 14 minutes. Break markers are provided at 10 minute locations within each data stream, and the advertisement duration time is four minutes and cannot be inhibited by the viewer. Assume that there is no minimum buffer. Table 2A provides the start time and the end times of the program for each respective user device 16, and a numerical identification of each stream provided in response to the initial request by the respective user device 16.

TABLE 2A

| Stream | User Device | Start Time | End Time |
| --- | --- | --- | --- |
| 1 | 16A | 3:00 | 4:00 |
| 2 | 16B | 3:02 | 4:02 |
| 3 | 16C | 3:03 | 4:03 |
| 4 | 16D | 3:12 | 4:12 |
| 5 | 16E | 3:14 | 4:14 |

Table 2B indicates which stream is provided to which respective viewer at a particular time. Shaded cells indicate the presence of a break marker in the stream immediately preceding the shaded cell. For example, the shaded cell at 3:10 for the column entitled "User Device 16A" indicates the user device 16A detected a break marker at the end of minute 10 of data stream 1. The user device 16A provided a EDLT to the headend 10 as previously described and was provided data stream 3 by the headend 10. Similarly, at 3:12, the user device 16B detected a break marker at the end of minute 10 of data stream 2. The user device 16B provided an EDLT to the headend 10 as previously described, and was also provided data stream 3. Note that Table 2B illustrates that at no time are more than three data streams of the program provided over the shared medium 12, even though there are five viewers of the program, and at many times the five viewers were serviced by only two data streams.

TABLE 2B

| Time | USER DEVICE 16A | USER DEVICE 16B | USER DEVICE 16C | USER DEVICE 16D | USER DEVICE 16E | Number Of Simultaneous Streams |
| --- | --- | --- | --- | --- | --- | --- |
| 3:00 | 1 | | | | | 1 |
| 3:01 | 1 | | | | | 1 |
| 3:02 | 1 | 2 | | | | 2 |
| 3:03 | 1 | 2 | 3 | | | 3 |
| 3:04 | 1 | 2 | 3 | | | 3 |
| 3:05 | 1 | 2 | 3 | | | 3 |
| 3:06 | 1 | 2 | 3 | | | 3 |
| 3:07 | 1 | 2 | 3 | | | 3 |
| 3:08 | 1 | 2 | 3 | | | 3 |
| 3:09 | 1 | 2 | 3 | | | 3 |
| 3:10 | 3 | 2 | 3 | | | 2 |
| 3:11 | 3 | 2 | 3 | | | 2 |
| 3:12 | 3 | 3 | 3 | 4 | | 2 |
| 3:13 | 3 | 3 | 3 | 4 | | 2 |
| 3:14 | 3 | 3 | 3 | 4 | 5 | 3 |
| 3:15 | 3 | 3 | 3 | 4 | 5 | 3 |
| 3:16 | 3 | 3 | 3 | 4 | 5 | 3 |
| 3:17 | 3 | 3 | 3 | 4 | 5 | 3 |
| 3:18 | 3 | 3 | 3 | 4 | 5 | 3 |
| 3:19 | 3 | 3 | 3 | 4 | 5 | 3 |
| 3:20 | 3 | 3 | 3 | 4 | 5 | 3 |
| 3:21 | 3 | 3 | 3 | 4 | 5 | 3 |
| 3:22 | 3 | 3 | 3 | 5 | 5 | 2 |
| 3:23 | 3 | 3 | 3 | 5 | 5 | 2 |
| 3:24 | 3 | 3 | 3 | 5 | 5 | 2 |

Those skilled in the art will recognize improvements and modifications to the preferred embodiments of the present invention. All such improvements and modifications are considered within the scope of the concepts disclosed herein and the claims that follow.

What is claimed is:

1. A method for reducing a number of data streams providing a program to viewers comprising:
    receiving a first data stream of the program, the first data stream beginning at a first time interval;
    effecting display of the program using the first data stream relative to the first time interval;
    detecting a break marker occurring at a break marker location time in the first data stream, the break marker corresponding to an advertisement within the first data stream having an advertisement time;
    determining an earliest data stream location time based on the break marker location time and the advertisement time;
    receiving a second data stream that begins at a second time interval later than the first time interval where the second data stream is at a location between the earliest stream location time and the break marker location time;
    buffering the second data stream;
    effecting display of the program using the second data stream at a program location corresponding to the break marker location time in the first data stream such that the program displayed using the second data stream is displayed at a same program location in the first data stream where the break marker occurred using the buffered the second data stream.

2. The method of claim 1 further comprising effecting display of an advertisement using the first data stream and before effecting display of the program.

3. The method of claim 2 further comprising buffering at least the portion of the second data stream while effecting display of the advertisement.

4. The method of claim 2 wherein effecting display of the advertisement further comprises effecting, by a user device, display of the advertisement, and wherein the advertisement is stored in its entirety in the user device prior to effecting display of the advertisement.

5. The method of claim 1 wherein the first data stream comprises a first multicast data stream requested by a first viewer and the second data stream comprises a second multicast data stream requested by a second viewer.

6. The method of claim 5 wherein the first viewer is added to the second multicast data stream and is removed from the first multicast data stream.

7. The method of claim 1 wherein the first data stream of the program comprises a first plurality of break markers.

8. The method of claim 7 wherein the second data stream of the program comprises a second plurality of break markers, and wherein the first plurality of break markers are at same respective locations in the program as the second plurality of break markers.

9. An apparatus for reducing a number of data streams providing a program to viewers comprising:
   an interface for communicating over a communications path; and
   a control system coupled to the interface and adapted to:
      receive a first data stream of the program, the first data stream beginning at a first time interval;
      send the first data stream to a display device;
      detect a break marker occurring at a break marker location time in the first data stream, the break marker corresponding to an advertisement within the first data stream having an advertisement time;
      determine an earliest data stream location time based on the break marker location time and the advertisement time;
      receive a second data stream that begins at a second time interval later than the first time interval where the second data stream is at a location between the earliest stream location time and the break marker location time;
      buffer the second data stream;
      send the buffered second data stream to the display device, the buffered second data stream being at a program location corresponding to the break marker location time in the first data stream, wherein buffering the second data stream allows for sending the buffered second data stream such that the buffered second data stream is displayed at a same program location in the first data stream where the break marker occurred.

10. The apparatus of claim 9 wherein the control system is further adapted to send an advertisement to the display device before the second data stream is sent to the display device.

11. The apparatus of claim 10 wherein the control system is further adapted to buffer at least a portion of the second data stream while the advertisement is sent to the display device.

12. The apparatus of claim 10 wherein the advertisement is stored in its entirety on the apparatus before the advertisement is sent to the display device.

* * * * *